(12) United States Patent
Suleman et al.

(10) Patent No.: US 10,223,445 B2
(45) Date of Patent: Mar. 5, 2019

(54) HYBRID NATURAL LANGUAGE PROCESSOR

(71) Applicant: MALUUBA INC., Toronto (CA)

(72) Inventors: Kaheer Suleman, Cambridge (CA); Adrian Petrescu, Guelph (CA); Joshua Pantony, New York, NY (US); Wilson Hsu, Waterloo (CA); Julian Brooke, Kitchener (CA)

(73) Assignee: Maluuba Inc., Waterloo (CA)

( * ) Notice: Subject to any disclaimer, the term of this patent is extended or adjusted under 35 U.S.C. 154(b) by 0 days.

(21) Appl. No.: 14/490,275

(22) Filed: Sep. 18, 2014

(65) Prior Publication Data

US 2015/0081279 A1    Mar. 19, 2015

Related U.S. Application Data

(60) Provisional application No. 61/879,831, filed on Sep. 19, 2013.

(51) Int. Cl.
| G06F 17/27 | (2006.01) |
| G06F 17/28 | (2006.01) |
| G06F 17/30 | (2006.01) |
| G06N 99/00 | (2019.01) |

(52) U.S. Cl.
CPC ........ *G06F 17/30705* (2013.01); *G06F 17/27* (2013.01); *G06F 17/30654* (2013.01); *G06F 17/30684* (2013.01); *G06N 99/005* (2013.01)

(58) Field of Classification Search
None
See application file for complete search history.

(56) References Cited

U.S. PATENT DOCUMENTS

| 2008/0028010 A1* | 1/2008 | Ramsey ............. G06F 17/30634 |
| 2011/0179024 A1* | 7/2011 | Stiver ............... G06F 17/30675 |
| | | 707/728 |
| 2011/0238637 A1* | 9/2011 | Morozov .......... G06F 17/30578 |
| | | 707/694 |
| 2012/0254143 A1* | 10/2012 | Varma ............... G06F 17/30401 |
| | | 707/706 |
| 2013/0152092 A1* | 6/2013 | Yadgar ................ H04M 3/4936 |
| | | 718/102 |
| 2014/0108453 A1* | 4/2014 | Venkataraman ............................ G06F 17/30997 |
| | | 707/774 |

FOREIGN PATENT DOCUMENTS

WO    2013010262 A1    1/2013

OTHER PUBLICATIONS

European Patent Application No. 14185449.7 Extended Search Report dated Mar. 12, 2015.

* cited by examiner

*Primary Examiner* — Richa Mishra (57) ABSTRACT

Methods and a natural language processor for processing a natural language query are provided. The processor includes a classifier, a rule-based pre-processor, a rule-based post-processor, a named entity recognizer, and an output module. The method involves receiving a text representation of the natural language query, pre-processing the text representation, applying a classification statistical model to the text representation when pre-processing fails, applying a post-processing rule, and performing name entity recognition.

11 Claims, 9 Drawing Sheets

Example rules
434

(WHERECANI)&(<businessfinder>)&(!((<directions>)|(<web>))):BUSINESSFINDER (TIMETABLE)&(((NUMBER)|(route)|(line)):TRANSIT (SHOULD)&(!((<weather_activity>)|(<sports>)|(<weather_item>)|(<weather>))):!WEATHER (QUESTION)&(((my friends)|(my followers)):SOCIAL|CONTACT

FIG. 7

```
{
  "domain": "CALENDAR",
  "subdomain": "CALENDAR_CREATE_EVENT",
  "entryList": null,
  "contextPool": {
      "PostASRSentence": "set up a meeting tomorrow at 6 pm about patents",
      "TimeZone": "America/New_York"
  },
  "entityList": [
      {
        "entityType": "DATERANGE",
        "value": "tomorrow"
      },
      {
        "entityType": "TIMERANGE",
        "value": "6 pm"
      },
      {
        "entityType": "MEETINGTITLE",
        "value": "meeting about patents"
      },
      {
        "entityType": "GPSLAT",
        "value": "43.464258"
      },
      {
        "entityType": "GPSLONG",
        "value": "-80.52041"
      }
  ]
}
```

Example Output from entity Aggregator 452

FIG. 8

```
{
  "domain": "CALENDAR",
  "subdomain": "CALENDAR_CREATE_EVENT",
  "entryList": null,
  "contextPool": {
    "PostASRSentence": "set up a 2 hour meeting at 7 tomorrow evening",
    "TimeZone": "America/New_York"
  },
  "entityList": [
    {
      "entityType": "LENGTHOFTIME",
      "value": "2 hour"
    },
    {
      "entityType": "DATERANGE",
      "value": "tomorrow"
    },
    {
      "entityType": "MEETINGTITLE",
      "value": "meeting"
    },
    {
      "entityType": "TIMERANGE",
      "value": "7 evening | 2 hour"
    },
    {
      "entityType": "GPSLAT",
      "value": "43.464258"
    },
    {
      "entityType": "GPSLONG",
      "value": "-80.52041"
    }
  ]
}
```

Example Output from entity Aggregator 452

FIG. 9

HYBRID NATURAL LANGUAGE PROCESSOR

RELATED APPLICATIONS

This application claims priority from U.S. Provisional Patent Application No. 61/879,831, filed Sep. 19, 2013, the contents of which are incorporated herein by reference.

FIELD

The present disclosure relates to natural language processing, and more particularly, to a multistage natural language processing system, method and computer program product.

BACKGROUND

Natural language processing (NLP) is a field of computer science, artificial intelligence, and linguistics concerned with the interactions between computers and human (natural) languages. As such, NLP is related to the area of human-computer interaction. Many challenges in NLP involve natural language understanding—that is, enabling computers to derive meaning from human or natural language input.

A known approach in creating NLP systems is to train several statistical models configured to classify a particular natural language query into a category, as well as using other statistical models to perform named entity recognition on the query to extract atomic elements referred to as entities. One shortcoming with this approach is that classification may require significant computing resources (and hence, computing time) in order to classify between a large number of categories.

Another such problem with NLP approaches that use statistical models is that statistical models may have difficulty classifying certain queries correctly when a few words in the query can significantly alter its meaning. Similar queries may be classified into the same domain, when one query should be classified into a particular domain and the other query should be classified into a different domain.

SUMMARY

This summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Broadly speaking, the invention relates to a hybrid natural language processing system, computer-implemented method, and computer program product for processing digital audio commands and/or text commands. In the remainder of this description, the input command provided by the natural language processor of the invention will be referred to as audio input 152 (or query 152), although the natural language processor of the invention is configured to receive input commands in a variety of formats including text-based commands input via a keyboard or other input device and all such commands are intended to fall within the term audio command. The natural language processor may include at least one statistical model for classifying the text representation of the audio input 152 into a domain of functionality, a rule-based classifier for restricting the classification option provided by the at least one statistical model, and a named entity recognition module (NER module) for extracting any relevant entities that may be embodied within the command.

In one aspect, the NER modules includes an aggregator for reformatting and/or combining entities based on rules.

In an aspect, the natural language processor includes rules that may override and/or restrict the domain selection of the primary classifier. In another aspect, the secondary classifier includes a trained model for each supported task in the domain selected by the primary classifier.

In accordance with an aspect of the specification, there is provided a computer-implemented method for processing a natural language query. The method involves receiving a text representation, which can be the actual text entered by a user in any suitable manner such as via a keyboard, or which can be produced as the output of an automatic speech recognition subsystem, of the natural language query at a natural language processor; applying at least one pre-processing rule to the query to classify the query; classifying the query using at least one classification statistical model if a match is not with at least one rule; applying one or more post-processing rules to the query in which the classification made by the at least one classification statistical models may be modified; and performing named entity recognition on the query to extract the entities relevant to the classification of the query, wherein the modification applied by the post-processing rules may be selected from the group comprising: overriding the classification decision of the statistical model, restricting the classification of the statistical model.

In accordance with another aspect of the specification, there is provided a natural language processor operating on a computing device for processing a user query received as input to a computing device. The processor including a classifier for classifying the user query into a category of functionality based on the user's intent; a rule-based pre-processor for classifying the user query into a category of functionality based on the user's intent as embodied in regular expressions with the query; a rule-based post-processor for overriding the classification of the classifier if at least one rule is true; a named entity recognizer for extracting entities from the query to be used as parameters when performing the task intended by the user; and an output module for sending the derived intent, task, and parameters to another component of a distributed system for further processing. The classifier may include a primary classifier for classifying the query into a particular category, and a secondary classifier configured to classify the query as being associated with a particular task. The rule-based post-processor may include at least one rule that compares the query against at least one synset. The rule-based post-processor may include at least one rule that compares the query against at least on regular expression. At least some components of the rule-based pre-processor may reside on a mobile device.

Other aspects and advantages of the invention will become apparent from the following detailed description taken in conjunction with the accompanying drawings which illustrate, by way of example, the principles of the invention.

BRIEF DESCRIPTION OF THE DRAWINGS

Reference will now be made, by way of example only, to the accompanying drawings in which.

DETAILED DESCRIPTION OF THE EMBODIMENTS

Figure 1:
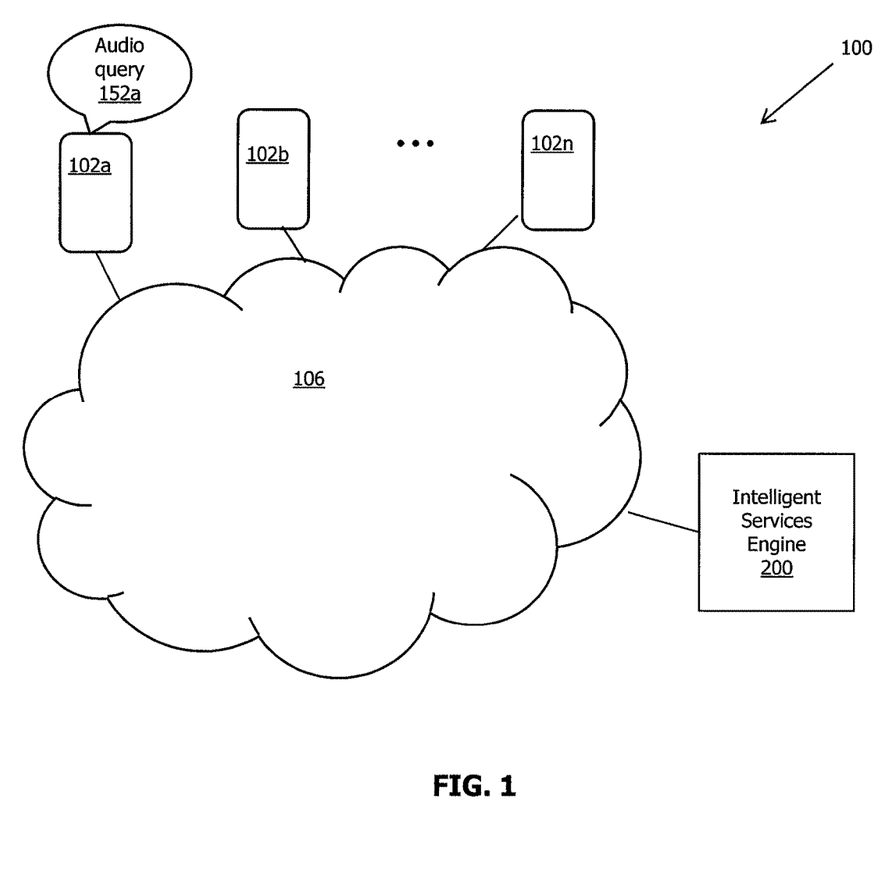
FIG. 1 is a block diagram of an exemplary networked environment of an intelligent services system for providing information and tasks to a user according to one embodiment.

Reference is first made to FIG. 1 which illustrates an exemplary networked environment 100 configured to provide services and/or information to users of devices 102a-102n. In one embodiment, an application 101 on a computing device 102 (such as a smartphone) receives a audio input 152 and directs the audio command or a text representation thereof to an Intelligent Services Engine 200 for processing. The intelligent services engine 200 may include a Natural Language Processing Engine 214 (hereinafter referred to as NLP engine 214 or natural language processor engine 214) configured to derive the intent of the user and extract relevant entities form the user's audio input 152. As will be appreciated, many users may simultaneously access the intelligent services engine 200 through their smartphones 102a,b . . . n over a wired and/or wireless network 106 such as the Internet.

Figure 2:
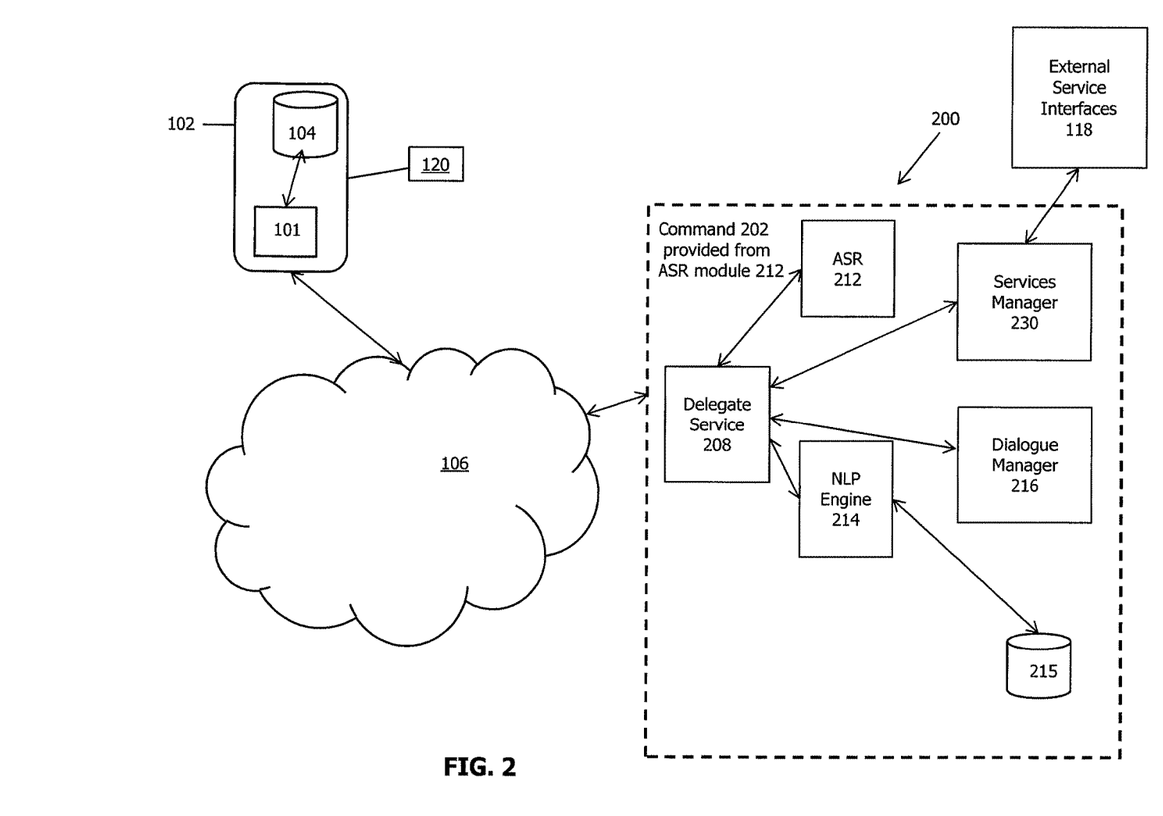
FIG. 2 is a block diagram showing an intelligent services engine that employs the natural language processor of the invention, according to one embodiment.

FIG. 2 illustrates a block diagram of one embodiment of the intelligent services engine 200 that may employ the natural language processor of the invention. The intelligent services engine 200 includes an Automatic Speech Recognition Module 212 (ASR module 212) configured to convert the audio input 152 into a text representation 202. It is to be appreciated by a person of skill in the art with the benefit of this description, that although the present embodiment receives audio input converted to text, other embodiments can receive other forms of input converted to a text representation. In further embodiments, the user input can also be in text format, such as from a keyboard input, in which the text representation would be the actual unconverted input. The intelligent services engine 200 may include several components/modules that facilitate the processing of audio input 152 as well as intelligently deriving the intention of the user (based on the text representation of the audio input 152) as well as selecting an appropriate internal service 120 or external service 118 adapted to perform the task.

The computing device 102 (herein sometimes referred to as smartphone 102) may be a laptop or desktop computer, a cellular telephone, a smartphone, a set top box, and so forth to access the intelligent services engine 200. In the present embodiment, the computing device 102 includes an application 101 and a memory storage unit 104. The application 101 provides an interface for accessing the services engine 200 and for receiving output and results produced by the services engine 200 and/or external providers in communication with the services engine 200. It is to be appreciated that the embodiment shown is particularly limited and that various components of the services engine can be resident on the computing device 102. For example, a pre-processor, or portions of the pre-processor can be located in the computing device 102 such that pre-processing can be carried out prior to sending the input to the services engine 200 for further processing.

It is to be appreciated that the intelligent services engine 200 can provide services via smartphone 102 as well as provide control over smartphone 102 (or another computing device 102) by sending commands and queries to the application 101. For example, the smartphone may search the Internet for information by expressing an appropriate query into their smartphone 102, for example, "What is the capital city of Germany?" The application 101 receives the audio query by interfacing with the microphone(s) on the smartphone 102, and may direct the audio query to the intelligent services engine 200. Modules 208, 212, 214, 216, 230 and the like cooperate to convert the audio input 152 into a text representation, derive the intention of the user, and perform commands according to the derived intention of the user as embodied in the text representation of the audio input 152. In some exemplary embodiments, a command in audio form and/or by using other input modes such as touchscreen, mouse, keyboard, and so forth. One or more databases 215 may be accessible to electronically store information, such as statistical models, natural language rules, regular expressions, rules, gazetteers, synsets, and so forth.

Figure 3:
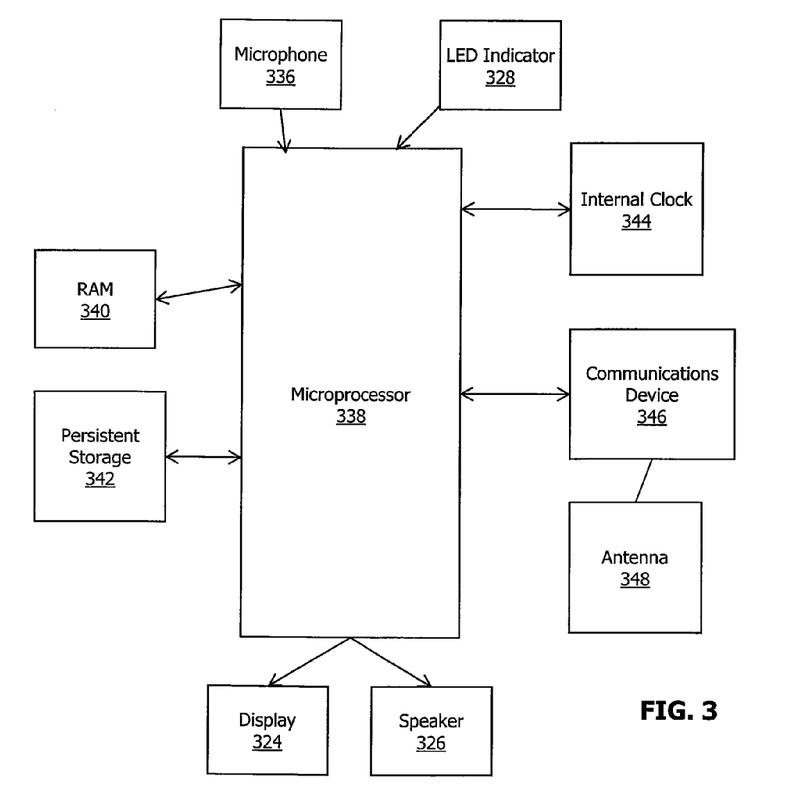
FIG. 3 is a block diagram of some components of an exemplary computing device (including a smartphone) that may be used with one embodiment.

Referring to FIG. 3, a block diagram of certain components of a portable electronic device in accordance with an embodiment is indicated generally by the numeral 102. In various exemplary embodiments, the portable electronic device 102 is based on the computing environment and functionality of a hand-held wireless communication device which may be referred to herein as smartphone 102. It will be understood, however, that the electronic device is not limited to a hand-held wireless communication device. Other electronic devices are possible, such as laptop computers, personal computers, set-top boxes, electronic voice assistants in vehicles, and the like.

Smartphone 102 is based on a microcomputer that includes a microprocessor 338 (also referred to herein as a processor) connected to a random access memory unit (RAM) 340 and a persistent storage device 342 that is responsible for various non-volatile storage functions of the smartphone 102. Operating system software executable by the microprocessor 338 is stored in the persistent storage device 342, which in various embodiments is flash memory. It will be appreciated, however, that the operating system software can be stored in other types of memory such as read-only memory (ROM). The microprocessor 338 receives input from various input devices including the touchscreen 330, communications device 346, and microphone 336, and outputs to various output devices including the display 324, the speaker 326 and the LED indicator(s) 328. The microprocessor 338 is also connected to an internal clock 344.

In various embodiments, the smartphone 102 is a two-way RF communication device having voice and data communication capabilities. Smartphone 102 also includes Internet communication capabilities via one or more networks such as cellular networks, satellite networks, Wi-Fi networks and so forth. Two-way RF communication is facilitated by a communications device 346 that is used to connect to and operate with a data-only network or a complex voice and data network (for example GSM/CPRS, CDMA, EDGE, UMTS or CDMA2000 network, fourth generation technologies, etc.), via the antenna 348.

Although not shown, it is to be appreciated that a battery provides power to active elements of the smartphone 102.

The persistent storage device 342 also stores a plurality of applications executable by the microprocessor 338 that enable the smartphone to perform certain operations including the communication operations referred to above. Other applications software is provided including, for example, an email application, a Web browser application, an address book application, a calendar application, a profiles application, and others that may employ the functionality of the invention. Various applications and services on smartphone 102 may provide application programming interfaces for allowing other software modules to access the functionality and/or information available by interfaces to an internal service 120.

Figure 4:
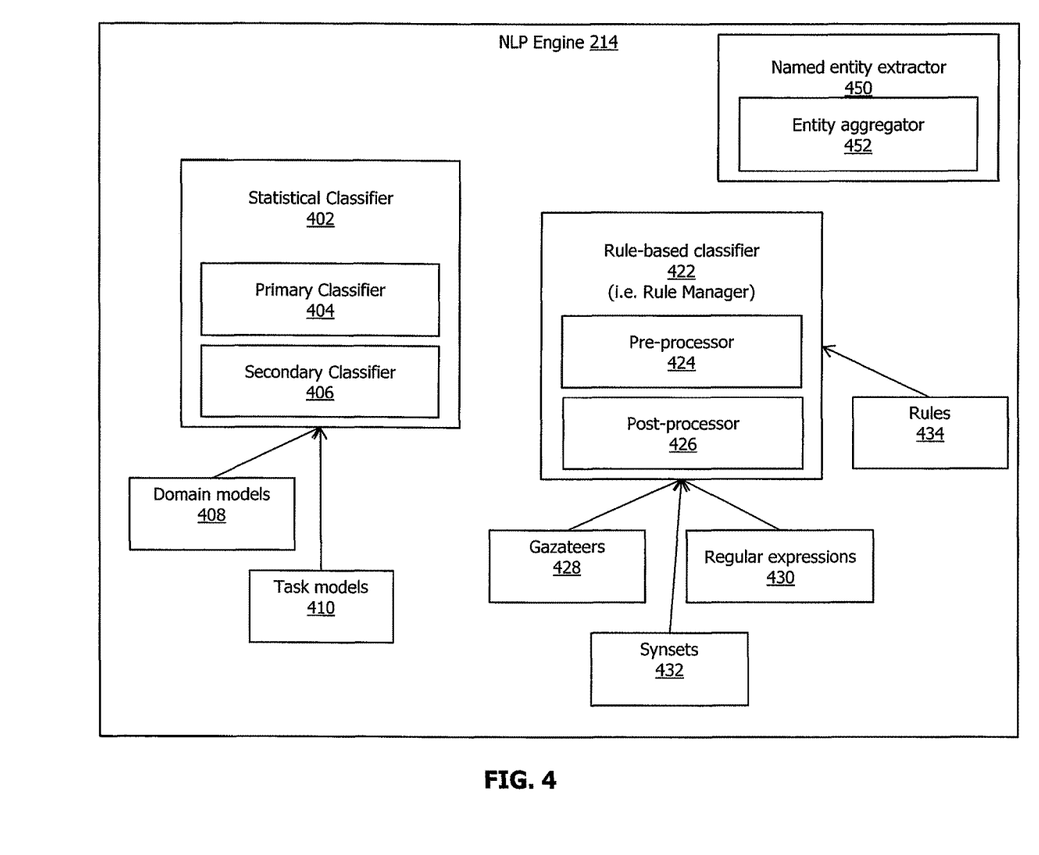
FIG. 4 is a block diagram showing some components of an exemplary natural language processor of the invention, in accordance with one embodiment.

Referring next to FIG. 4, a block diagram is shown of some components of an exemplary NLP engine 214 (natural language processor) for deriving the intention of the user from the text representation of the audio input 152 as well as performing named entity recognition on the text representation of the audio input 152.

NLP engine 214 may include a statistical classifier configured to apply one or more models statistical models 408, 410 in classifying the text representation of the audio input 152 into a domain, and in some embodiments, into a sub-domain as well. A domain is general class of action or functionality such as the CALENDAR domain, the WEATHER domain, and so forth. In one embodiment, each domain of functionality offered by application 101 has a particular statistical model 408 that is trained to recognize queries that lie within the domain of functionality offered by the domain. The natural language processor may include one type of classifier or a combination of classifiers, such as support vector machines (SVMs), random forest trees, Naïve Bayes classifiers, and so forth. In one embodiment, more than one type of classifier is used to classify the text representation of the audio input 152, the classifiers being aggregated using a neural network and/or reciprocal rank fusion. Classifying a given text representation of the audio input 152 into a domain may be performed by a primary classifier which has access to the statistical models 408 for each domain, as well as a variety of aggregators as employed in a particular implementation.

From time to time, the domain models 408 may be updated with new or modified training data. In some embodiments, the natural language processor includes a training manager (not shown) configured to retrain existing models 408 and/or new models at periodic intervals, upon the happening of some events.

The statistical classifier 402 may include at least one secondary classifier 406 which may be configured to classify the text representation of the audio input 152 into a particular task based on the domain classification of the primary classifier 404. By way of example, a particular application 101 that uses an embodiment of the natural language processor engine 214 of the invention may offer functionality within three domains, namely: CALENDAR, WEATHER, and STOCKS.

The CALENDAR domain allows three tasks: booking a meeting, modifying a meeting and deleting a meeting.

The WEATHER domain allows two tasks: finding a short term forecast by location, and finding a long term forecast by location.

The STOCKS domain allows three tasks: buying a stock, selling a stock, and finding stock quotes.

The application 101 can be configured to receive audio input 152, such as: "Book me a 3 p.m. meeting about the budget", "Get me the long term forecast for San Francisco", "Buy 30 shares of Microsoft at the market price", and so forth. The text representation of the audio input 152 may be directed to the NLP engine 214 which uses a primary classifier 404 to determine to which of the supported domains the text representation of the audio input 152 is likely directed. In one embodiment, the primary classifier 404 employs several support vector machines, each of which classifies the text representation of the audio input 152 into one of two classes. Given that the application 101 supports three domains in the example, the primary classifier 404 may include three SVMs, namely: {CALENDAR, WEATHER}, {CALENDAR, STOCKS}, {WEATHER, STOCKS} where the items in the curly braces are the two classes (i.e. domains) in which the text representation of the audio input 152 will be classified.

A typical SVM takes a set of input data and predicts, for each given input (i.e. the text representation of the audio input 152), which of two possible domains forms the output, making it a non-probabilistic binary linear classifier. Given a set of training examples, each marked as belonging to one of two domains, an SVM training algorithm builds a model that assigns new input into one domain or the other. An SVM model is a representation of the examples as points in space, mapped so that the examples of the separate categories are divided by a clear gap that is as wide as possible. New voice commands are then mapped into that same space and predicted to belong to a domain based on which side of the gap they fall on.

The result of each SVM may be ranked, and in some embodiments, the highest rank will be selected by the primary classifier 404 as the most likely domain classification for the text representation of the audio input. The input to each SVM may be a feature vector representing the text representation of the audio input 152, where each feature represents a feature the text representation either has or doesn't have. In one embodiment the feature vector is made up of binary features that have a value of '1' or '0'.

In one embodiment, once the primary classifier 404 has selected a domain from the outputs of the SVMs, a pre-trained secondary classifier 406 is employed to determine to which task the text representation of the audio input 152 relates. As mentioned above, the CALENDAR domain supports three tasks, the WEATHER domain supports two tasks and the STOCKS domain supports three tasks. The secondary classifier 406 may apply additional statistical models configured to determine to which task the text representation of the audio input 152 relates in light of the classification performed by the primary classifier 404. As an example, the text representation "Get me the long term forecast for San Francisco" is received. The primary classifier 404 classifies the text representation of the audio input 152 as belonging to the WEATHER domain, the result being directed to the secondary classifier 406. The secondary classifier 406 applies one or more task models 410 associated with the WEATHER domain to determine the specific task intended.

In one embodiment, each task supported by the domain has a trained Naïve Bayes model which outputs a probability based on the input (i.e. a feature vector representing the text representation of the audio input 152). A Naïve Bayes classifier is a simple probabilistic classifier based on applying Bayes' theorem with strong (naive) independence assumptions. In simple terms, a Naïve Bayes classifier assumes that the presence (or absence) of a particular feature of a class is unrelated to the presence {or absence) of any other feature, given the class variable. Continuing with the example, the secondary classifier 406 applies the feature vector representing the text representation of the audio input 152 to statistical models: one model 410 that outputs the probability that the command relates to finding a short-term weather forecast, and another model 410 that outputs the probability that the command relates to finding a long-term weather forecast. In the above example, secondary classifier 406 determines that text representation relates to finding the longterm weather forecast for a location.

PRE-PROCESSING

The natural language processor engine 214 may include one or more pre-processors 424 that apply a variety of rules to the text representation of the audio input 152 in advance of processing by the statistical classifier 402. Rule-based systems typically have high-precision, low-recall rules in relation to statistical models, and as such, can provide useful functionality to the natural language processor.

In one embodiment, the pre-processing rules are predetermined and may be updated or modified at any time. The rules may be executed on the smartphone 102, so that in certain cases, the audio input 152 and any additional processing does not have to travel through the network 106. As an example, take the simple input of "Launch my organizer". The application 101 receives the audio input 152 and directs the audio input 152 to ASR module 212 which provides a text representation 202 of the audio input 152 (using speech recognition technology). The text representation the text representation of the audio input 202 may be compared against a series of regular expressions which represent simple, unambiguous commands. The example text representation of the audio input 152 may match a regular expression such as "Launch*" where the asterisk represents any number of characters after the word "launch". The rule manager 422 may compare the text representation 202 against the regular expression, and if a match is found, perform specific functionality relating to the expression. In the example, the rule manager 422 finds a match with "Launch*" and compares the string after the word "launch" with applications available on the smartphone 102. If a match is found, then the associated application is launched, and if not, a message may be displayed.

Rule based manager 422 may also apply a post-processor 426 at various stages after primary classification in order to modify the decision made by one or more domain models 408 and/or task models 410. In one embodiment, the post-processor 426 implements rules 434 that may modify, override, and/or restrict the decision of the primary classifier. Post-processor may reference various files such as Gazetteers 428, synsets 432, regular expression 430, rules 434, and so forth to determine if the decision made by the primary classifier 404 is to be modified.

Figure 7:
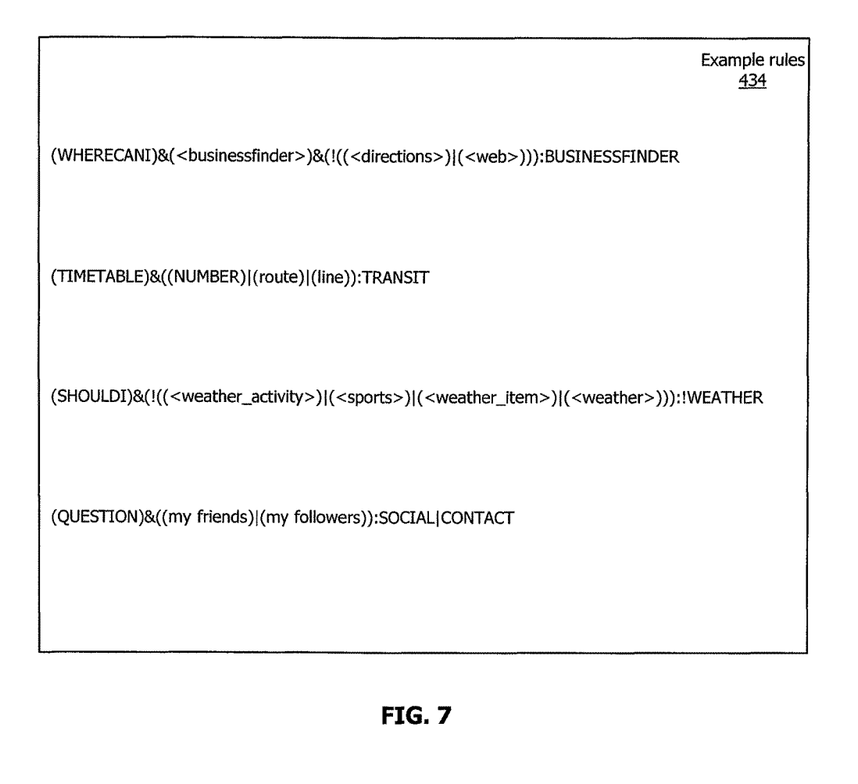
FIG. 7 is an exemplary rule set that may modify a classification decision made by a primary classifier, according to one embodiment.

Referring to FIG. 7, some example rules of the primary classifier 404 are shown that may be applied by rules manager 422 after primary classification has been performed on a given text representation of the audio input 152. All capital items in brackets (such as (WHERECANI)) in rule 702 refer to regular expression 430 that are substantially similar in meaning; items in < > refer to synsets (i.e. a collection of synonyms), and the item after the colon refers to the result of the rule. For example, rule 702 may be read as "if the query contains a phrase in the WHERECANI regular expression file and the businessfinder synset; and the query does not contain words/phrases in directions synset or the web synset; then the query is to be classified in the BUSINESSFINDER domain".

As mentioned above, the primary classifier 404 in one embodiment returns an ordered ranking of domains, ranking from highest to lowest. The rule 702 decides that the text representation of the audio input 152 is to be classified in the BUSINESSFINDER domain regardless of the classification performed by the primary classifier 404. In this example, the prost-processor 426 may override the decision of the primary classifier 404.

Rule 706 is a restriction on the primary classification, and can be read as: "If the command contains a phrase in the SHOULDI regular expression file; and does not contain a word in the weather_activity synset or the sports synset or the weather_item synset or the weather synset, then the WEATHER domain cannot be the classification for the command". Therefore, even if the primary classifier 404 returns a rank showing WEATHER as the highest ranked domain, the post-processor 426 will override this and return the next highest ranked domain as the proper classification.

Rule 708 allows two possible domains, namely the SOCIAL domain or the CONTACT domain if the command has a phrase in the QUESTION regular expression file, and contains either a friend or follower of the user.

It should be noted that the rules 434 applied by the post-processor above are merely exemplary and will typically be tailored to a particular application 101 and may be modified over time. The rules 434 supplement the classifier 404 and allow the adaptive nature of statistical classifiers to be fine-tuned as text representations are received. The rules 434 also provides a mechanism for improving the performance of statistical classifier without having to train and redeploy statistical models, which often reside in a cloud-computing environment. Accordingly, new cases can be added to a rules text file and deploy this file without having to retrain any models.

Although the rules shown in FIG. 7 are described as being performed by the post-processor 426, in some embodiments, it may be preferable to apply the rules before primary classification and/or after primary classification. When the rules are applied before primary classification, certain queries are automatically classified as belonging to a particular domain, and then may be diverted to the named entity extractor 450 for entity extraction.

Referring again to FIG. 4, the natural language processor engine 214 may also include a named entity extractor 450 configured to extract the relevant entities from a given command text representation 202 (i.e. the text representing an audio input 152). In one embodiment, extractor 450 references several conditional random field models (CRF models) that are trained to extract entities for a specific domain. For example, a CRF for the WEATHER domain may be trained to extract relevant entities such as a location. Similarly, the STOCKS domain may have a trained CRF to extract relevant entities such as stock ticker symbol, company name, stock exchange, buy or sell price, quantity of shares, and the like. NER performed by the extractor 450 seeks to locate and classify atomic elements in text (i.e. entities) into predefined categories such as the names of persons, organizations, locations, expressions of times, quantities, monetary values, percentages, etc. In some embodiments, the extractor is configured to extract complex phrases such as a text message from the text representation of the audio input 152 by performing semantic role labeling.

The extractor 450 may include an entity aggregator 452 configured to intelligently aggregate entities before the output data structure created by NLP engine 214 is directed to the services manager 230. In one embodiment, the aggregator 452 applies domain specific sometimes task specific) rules to aggregate entities. The aggregator may serve present entities in human readable form and/or to avoid complications with certain types of commands.

Figure 8:
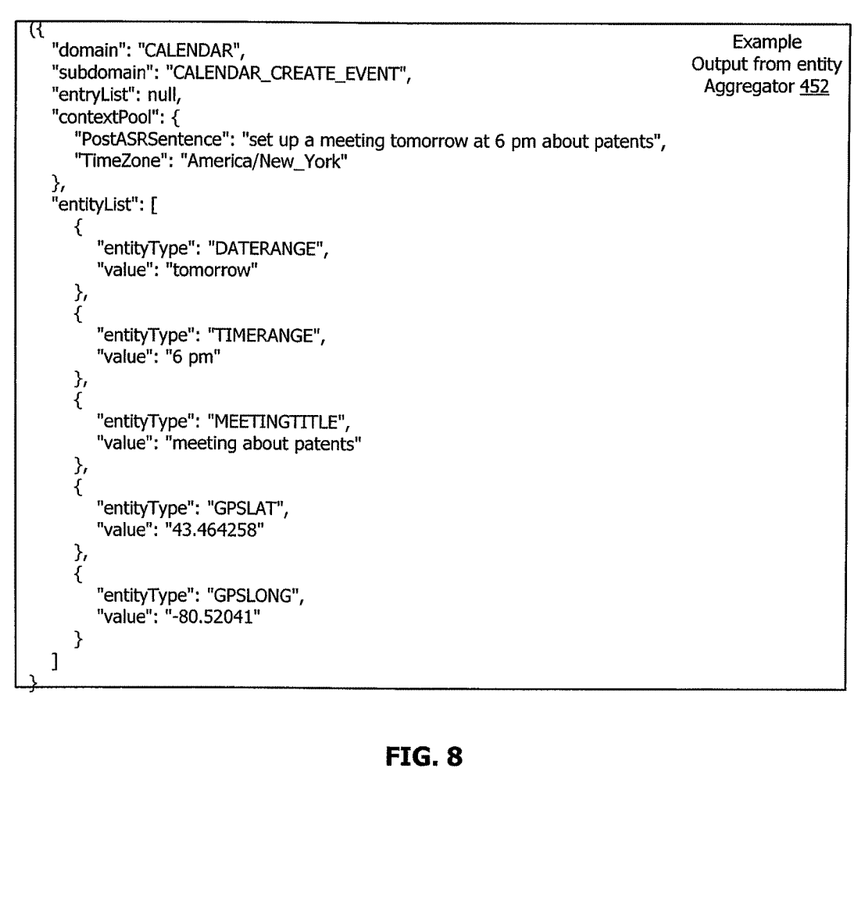
FIG. 8 is an exemplary data structure illustrating rule-based named entity recognition according to one embodiment.

For example, FIG. 8 illustrates template data structure created with NLP engine 214 after entity extraction and aggregation has been performed. As shown, the command "set up a meeting tomorrow at 6 pm about patents" was received. The primary classifier 404 has applied several SVMs to the text representation 202 representing the audio input 152, and has classified the text representation 202 as relating to the CALENDAR domain. The secondary classifier 406 has classified the text representation 202 as relating to the task CALENDAR_CREATE_EVENT using one or more task models (often Naïve Bayes classifiers trained for each task in a domain). Several entities have been extracted/aggregated by the extractor 450 including "DATERANGE" with a value "tomorrow", "TIMERANGE" with a value 6 pm, and "MEETINGTITLE" with a value of "meeting about patents". To obtain an entity of "meeting about patents" instead of "about patents" as was embodied in the audio input 152, the extractor 450 first extracts entities and then applies the aggregator 452 which may aggregate and/or reformat entities. In one embodiment, the aggregator 452 applies one or more rules to the extracted entity and/or query to aggregate an entity. For example, for a text representation of the audio input 152 classified in the CALENDAR domain/CALENDAR_CREATE_EVENT subdomain, the aggregator may search the text representation of the audio input 152 for words such as "meeting", "event", "appointment", and the like (which may be located in a gazetteer) to see if a match is made. If a match is found, the aggregator adds the word found in the gazetteer to the extracted meeting title of "about patents" to give a reformulated entity of "meeting about patents". The data structure shown in FIG. 8 may then be directed to services manager 230 so that a meeting can be created by calling an internal service 120 with the entities, including the reformulated MEETINGTITLE entity.

Figure 9:
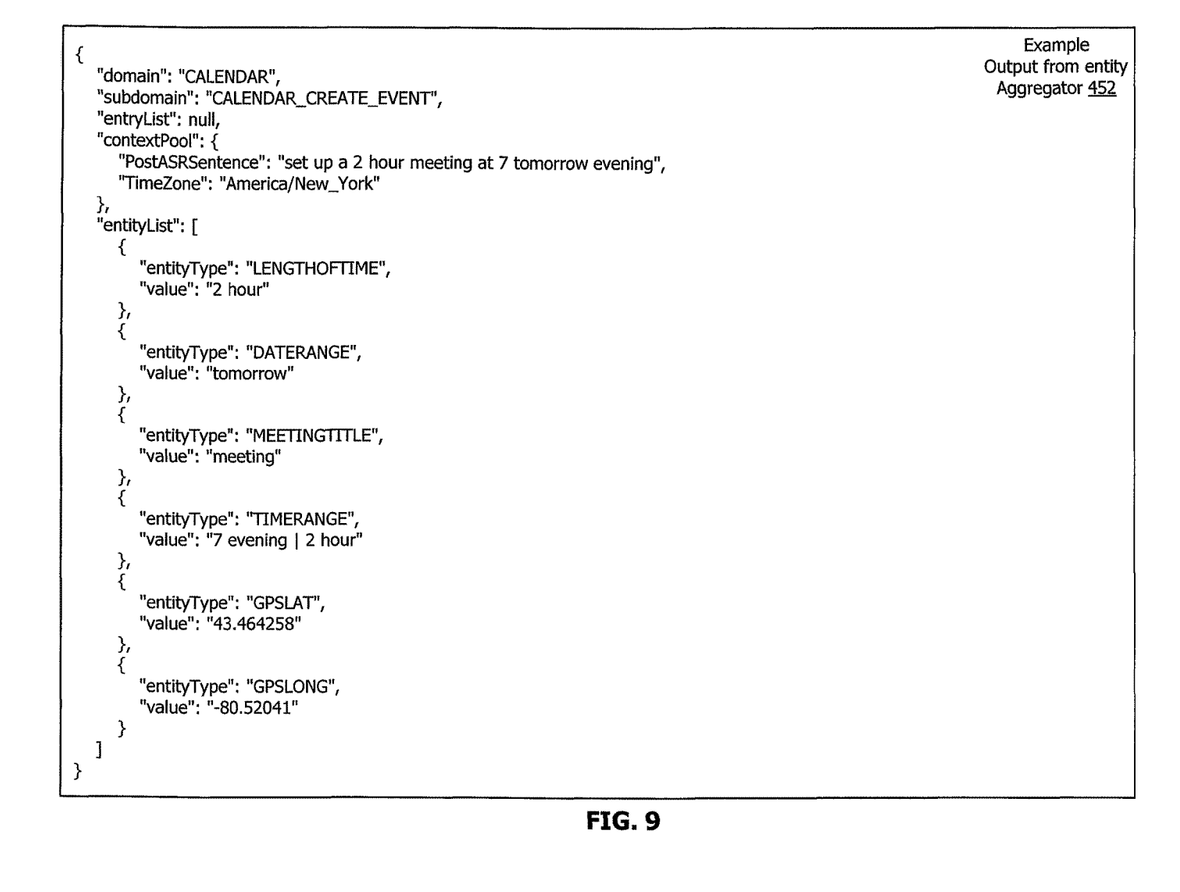
FIG. 9 is another exemplary data structure illustrating rule-based named entity recognition according to an embodiment.

Referring next to FIG. 9, another example of the rule-based NER performed by the aggregator 452 is illustrated. As shown, the text representation of the audio input 152 is "set up a 2 hour meeting at 7 tomorrow evening". The extractor 450 may extract two entities that appear to be start-times, namely "7 evening" and "2 hour". The extractor directs the entities to aggregator which applies one or more rules to the extracted entities to reformulate the entities, correct the extraction, and/or combine the entities into a single entity. In the example shown in FIG. 9, the aggregator 452 applies logic that determines that the entity "2 hour" is the duration of the meeting, and not the start time of the meeting, even though the extractor 450 was not able to correctly extract "2 hour" as the duration. Aggregator may have applied rules such as looking for the word "hour" or "minute" in the extracted entity and assigning the entity as the duration. By applying rules, aggregator creates an entity "7 evening|2 hour" which is then passed to services manager (along with the data structure shown in FIG. 9) which is configured to create a meeting from 7 p.m. to 9 p.m.

Figure 5:
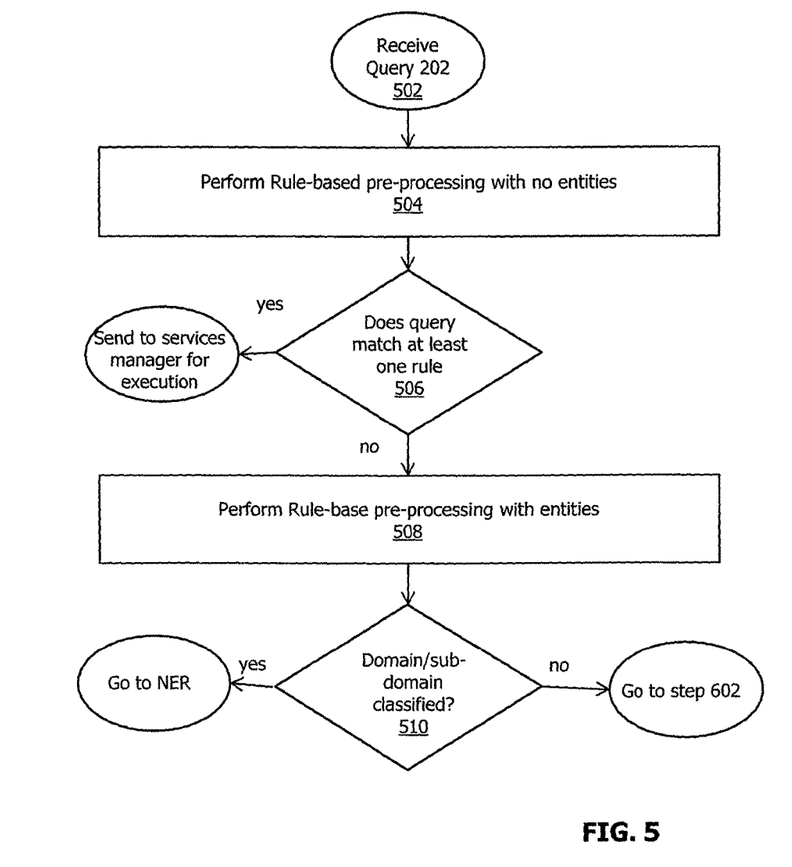
FIG. 5 is a flow diagram of exemplary operations (methods) for natural language processing of an audio command, according to one embodiment.
Figure 6:
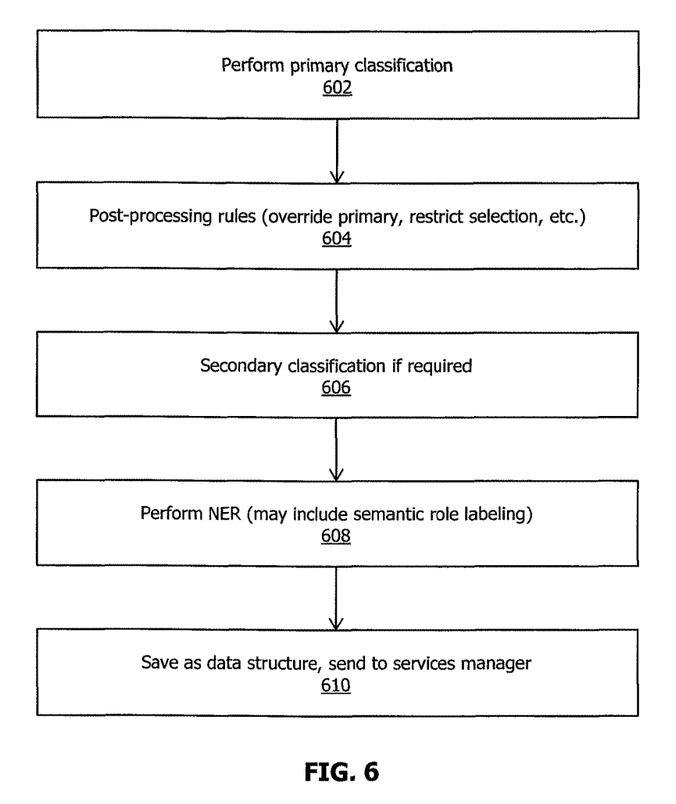
FIG. 6 is a flow of exemplary operations (methods) for natural language processing continued from FIG. 5.

Reference is next made to FIGS. 5 and 6 to describe general operations (methods) of natural language processing of text representation corresponding to a command according to one embodiment of the invention. At step 502, text representation 202 is received by the natural language processor engine 214 from ASR module 212. Relatively high-precision and low recall rules (relative to the statistical models 408, 410 that may be used) are applied at step 504. If a match is made (decision step 506), the task is performed without performing statistical NER. Any entity is instead extracted using string matching in one embodiment. If no rules apply to the command text representation 202 because there is no match, rule-based pre-processing is performed that may require statistical NER at step 508. At step 510, a determination is made as to whether the domain and/or sub-domain has been classified or selected based on a rule. If a domain and task is selected based on a rule, then the flow of operations goes to a NER step at 608. If only a domain is selected based on a rule, then the flow of operation may be direct to secondary classification at step 606. If no rules are matched, then primary classification may be performed using at least one statistical model at step 602. Primary classification typically involves, in one embodiment, creating a feature vector as an input to a statistical models that are associated with a particular domain, and then ranking the likelihood that the text representation of the audio input 152 belongs (is associated with) each domain. The feature vector generated as an input may be different for each domain model 408 in the sense that features relevant to the predicting domain associations may be different for each domain.

At step 604, a post-processor applies one or more rules that restrict the domain selection. In one embodiment, the rules employed by the post-processor may override a ranking provided by the models 408, modify the ranking, and/or restrict which domains are selectable by the natural language processor engine 214. In one embodiment, the post-processor rules may be applied before primary classification and/or after primary classification. At step 606, secondary classification may be performed using statistical models. Typically, a Naïve Bayes model is created and trained for a supported task in a domain, and the command text representation 202 is provided as an input (i.e. a feature vector representing the command text representation 202) to each task model 410 which ranks the likelihood that the text representation of the audio input 152 relates to a particular task. Once the domain/task pair is recognized for the text representation of the audio input 152, NER may be performed at step 608. NER may employ one or more statistical models such as conditional random fields to a feature vector and extract the relevant entities. Each domain, and in some cases each task, may have a specific CRF trained to extract entities. In one embodiment, several stages of NER may be performed.

At step 610, a data structure is created (examples shown in FIGS. 8 and 9) which may be directed to services manager 230 for further processing.

While specific embodiments have been described and illustrated, such embodiments should be considered illustrative only and should not serve to limit the accompanying claims.

What is claimed is:

1. A computer-implemented method of processing a plurality of natural language queries, the method comprising:
   receiving, at a server, the plurality of natural language queries at a natural language processor from a user device via a network;
   pre-processing the plurality of natural language queries to classify the plurality of natural language queries comprising:

determining that a first natural language query of the plurality of natural language queries corresponds to a pre-processing rule of a plurality of pre-processing rules; and selecting a service to perform a first task in response to the first natural language query based on the corresponding pre-processing rule;

processing a first subset of the plurality of natural language queries, wherein the first subset of natural language queries does not include at least the first natural language query, comprising:

identifying a domain of a second natural language query of the first subset of natural language queries;

identifying a first entity for the second natural language query by performing named entity recognition (NER) in the identified domain of the second natural language query; and based on the identified first entity for the second natural language query, selecting a service to perform a second task in response to the second natural language query;

applying a classification statistical model to the second subset of the plurality of natural language queries to rank a third natural language query, wherein the second subset of natural language queries does not include at least the first natural language query and the second natural language query;

applying a post-processing rule to the third natural language query of the second subset of natural language queries that results in a modification to the ranking of the third natural language query;

performing named entity recognition on the third natural language query to extract a second entity relevant to a third task according to a classification selected from the modified ranking of the third natural language query;

automatically generating at least one data structure for performing the third task; and passing the generated at least one data structure to a service to perform the third task in response to the third natural language query using the extracted second entity.

2. The method of claim 1, wherein applying the post-processing rule comprises comparing the third natural language query against a synset.

3. The method of claim 2, wherein applying the post-processing rule comprises comparing the third natural language query against a regular expression.

4. The method of claim 1, wherein at least one natural language query is a text representation of an audio input.

5. The method of claim 1, wherein at least one natural language query is text received from an input device.

6. A server for processing a plurality of natural language queries received as input at a computing device, the computing device comprising:

a memory storage unit for storing a database, the database having at least one of a statistical model, a plurality of natural language rules, regular expressions, gazateers, or sysnets; and a microprocessor in communication with the network interface and the memory storage unit, the microprocessor configured to:

receive the plurality of natural language queries, via a network, from the computing device;

pre-process the plurality of natural language queries, comprising:

determine that a first natural language query of the plurality of natural language queries corresponds to a pre-processing rule of a plurality of pre-processing rules; and select a service to perform a first task in response to the first natural language query based on the corresponding pre-processing rule;

classify each remaining natural language query of the plurality of natural language queries into a category of functionality based on a derived intent, wherein the remaining natural language queries do not include at least the first natural language query, wherein the derived intent is derived from each remaining natural language query by a natural language processing engine by applying at least one of a random forest tree and Naive Bayes classifiers to provide a ranking of categories of functionalities;

rank the categories of functionalities for each remaining natural language query based on the derived intent using a primary classification statistical model;

rank tasks of at least one of the ranked categories of functionalities for each remaining natural language query using a secondary classification statistical model;

extract an entity from at least a second natural language query of the remaining natural language queries relevant to a second task, wherein the second task is selected from the ranked tasks, the entity to be used as a parameter when performing the second task associated with a derived intent associated with the second natural language query; and based at least in part on the entity and the derived intent for the second natural language query, select a service to perform the second task in response to the second natural language query.

7. The server of claim 6, wherein the microprocessor is further configured to determine the second task associated with the second natural language query.

8. The server of claim 6, wherein the microprocessor is further configured to compare the second natural language query against a synset stored in a database.

9. The server of claim 8, wherein the microprocessor is further configured to compare the second natural language query against regular expressions stored in the database.

10. The server of claim 6, wherein at least one of the first natural language query and the second natural language query is received as an audio input, and wherein the microprocessor is further configured to convert the audio input to a text representation.

11. The server of claim 6, wherein at least one of the first natural language query and the second natural language query is received as text.

* * * * *